United States Patent [19]
Groebke

[11] 3,948,880
[45] Apr. 6, 1976

[54] PHENYL-AZO-PHENYL COMPOUNDS OF LOW SOLUBILITY IN WATER

[75] Inventor: Wolfgang Groebke, Oberwil, Switzerland

[73] Assignee: Sandoz Ltd., Basel, Switzerland

[22] Filed: May 28, 1974

[21] Appl. No.: 473,384

Related U.S. Application Data

[63] Continuation of Ser. No. 228,353, Feb. 22, 1972, abandoned, which is a continuation-in-part of Ser. No. 15,830, March 2, 1970, abandoned.

[30] Foreign Application Priority Data
Apr. 2, 1969 Switzerland.................. 5043/69

[52] U.S. Cl. ............................................ 260/207.1
[51] Int. Cl.² ......................................... C09B 29/08
[58] Field of Search........................ 260/207, 207.1

[56] References Cited
UNITED STATES PATENTS

| | | | |
|---|---|---|---|
| 2,891,942 | 6/1959 | Merian | 260/207.1 |
| 3,097,198 | 7/1963 | Fishwick et al. | 260/207.1 |
| 3,268,507 | 8/1966 | Kruckenberg | 260/207.1 X |
| 3,406,165 | 10/1968 | Kruckenberg | 260/207.1 |
| 3,552,905 | 1/1971 | Sartori | 260/207 X |
| 3,709,872 | 1/1973 | Koller | 260/207.1 |

FOREIGN PATENTS OR APPLICATIONS

| | | | |
|---|---|---|---|
| 1,514,544 | 1/1968 | France | 260/207.1 |
| 1,539,436 | 9/1968 | France | 260/205 |

Primary Examiner—Charles F. Warren
Attorney, Agent, or Firm—Gerald D. Sharkin; Richard E. Vila; Melvyn M. Kassenoff

[57] ABSTRACT

Dyes of the formula

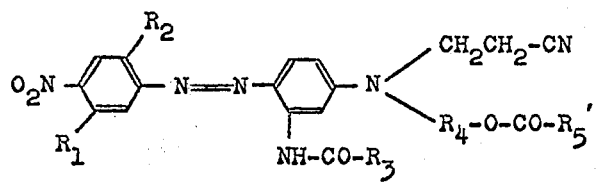

wherein
$R_1$ is hydrogen, chloro or bromo,
$R_2$ is chloro or bromo,
$R_3$ is lower alkyl or substituted lower alkyl,
$R_4$ is $-CH_2CH_2-$ or

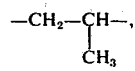

and
$R_5$ is lower alkyl or substituted lower alkyl,
wherein each substituent of each substituted lower alkyl is independently chloro, bromo, cyano or lower alkoxy, are highly suitable for dyeing and printing synthetic and semi-synthetic fibres consisting of high molecular-weight organic substances of hydrophobic character, and of textile materials made thereof. Resulting dyeings and prints are fast to thermofixation, sublimation, pleating, solvents, lubricants, dry cleaning, rubbing, ozone and gas fumes.

9 Claims, No Drawings

PHENYL-AZO-PHENYL COMPOUNDS OF LOW SOLUBILITY IN WATER

This application is a continuation of application Ser. No. 228,353, filed on Feb. 22, 1972 and now abandoned, which in turn is a continuation-in-part of application Ser. No. 15,830 filed on Mar. 2, 1970 and now abandoned.

This invention relates to azo compounds of the 2-halo-4-nitro-2'-alkylcarbonylamino-4'-(N-cyanoalkyl-N-alkylcarbonyloxyalkyl)-amino-1,1'-azobenzene series, which are highly suitable for dyeing and printing synthetic and semi-synthetic fibres consisting of high molecular weight organic substances of hydrophobic character, and of textile materials made thereof.

The new compounds are of the formula

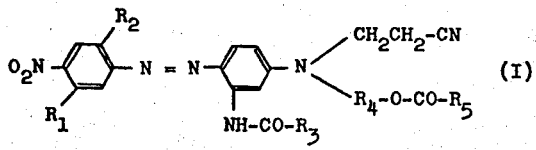

where
$R_1$ is hydrogen, chlorine or bromine,
$R_2$ is chlorine or bromine,
$R_3$ is lower alkyl,
$R_4$ is a radical of the formula $-CH_2CH_2-$ or $$-CH_2-CH- \atop | \atop CH_3$$

and $R_5$ is lower alkyl, of which the alkyl radicals $R_3$ and $R_5$ may bear chlorine, bromine, cyano or lower alkoxy as substituents.

By "lower alkyl and alkoxy" are understood alkyl and alkoxy radicals having 1, 2, 3 or 4 carbon atoms.

The new azo compounds are produced by diazotization of an amine of the formula

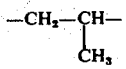

and coupling the resulting diazonium compound with a compound of the formula

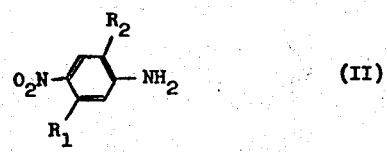

The diazotizing and coupling reactions are carried out by known methods. The coupling reaction generally takes place in acid medium at temperatures in the range of −10°C to +35°C or, more particularly, between 0°C and +5°C. It is often advantageous to conduct coupling in a medium buffered with, e.g., sodium acetate.

The compounds of formula (I) can, alternatively, be produced by acylation of a compound of the formula

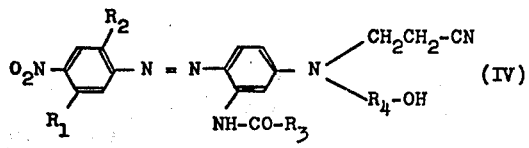

with an acid of the formula

$$R_5 - COOH \qquad (V)$$

or a derivative of an acid of this type, e.g. the anhydride, chloride or bromide, using the generally known methods.

Before their use it is advisable to convert the new dyes thus formed into dyeing preparations by means of normal methods for this purpose, such as grinding in the presence of dispersing agents and/or fillers. If desired, the resulting mixtures can be vacuum or injection dried to give powder preparations. After addition of a suitable volume of water thereto they can be applied by exhaustion dyeing, pad dyeing or printing process at long or short liquor ratio.

From aqueous dispersions the dyes build up excellently on fibres and textiles consisting of synthetic or semi-synthetic high molecular weight compounds of hydrophobic character. They are especially suitable for dyeing and printing polyester, cellulose diacetate, cellulose triacetate and polyamide fibres, and textiles of these fibres. They are also dyeable on polyolefin fibres.

The known dyeing and printing processes, for example that described in French Pat. No. 1,445,371, are employed. The dyeings and prints obtained have very good all-round fastness; in particular, they are outstandingly fast to thermofixation, sublimation, pleating, solvents, lubricats, dry cleaning, rubbing, ozone and gas fumes. The wet fastness properties, e.g. water, sea water, perspiration and washing fastness, are also very good. The light fastness and the reserve of cotton and wool are other salient features. The dyeings are highly stable to pre-cure and post-cure permanent press finishing and to soil release finishes, readily dischargeable and stable to boiling and reduction at temperatures up to about 220°C and especially in the range up to 150°C.

They also show good stability to acids and alkalis. These stability properties are not adversely affected by the liquor ratio or by the presence of dyeing accelerants.

In the following Example the parts are by weight and the temperatures are given in degrees centigrade.

EXAMPLE 1

One hundred seventy-three parts of 1-amino-2-chloro-4-nitrobenzene are stirred into 250 parts of concentrated hydrochloric acid and 350 parts of ice-water and diazotized at 0°–5° with a solution of 69 parts of sodium nitrite in 250 parts of water. The diazonium salt solution is combined with a solution of 300 parts of glacial acetic acid and 289 parts of 1-(N-cyanoethyl-N-acetoxyethyl)amino-3-acetylaminobenzene and 25 parts of urea at 0°–5°. Sodium acetate solution is added to complete the coupling reaction at pH 4. The dye settles out and is filtered off with suction, washed with water and dried. It gives dyeings of red shade on polyester fibres which have excellent fastness properties. In the following table further dyes are specified which can be produced in accordance with this invention and are of the formula

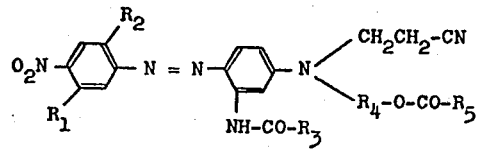

TABLE

| Example No. | $R_1$ | $R_2$ | $R_3$ | $R_4$ | $R_5$ | Shade on Polyester fibre |
|---|---|---|---|---|---|---|
| 2 | H | Cl | —$C_2H_5$ | —$CH_2CH_2$— | —$C_2H_5$ | red |
| 3 | H | Cl | —$CH_3$ | do. | do. | do. |
| 4 | H | Br | —$CH_3$ | do. | do. | do. |
| 5 | Cl | Cl | do. | do. | do. | do. |
| 6 | Br | Br | —$CH_3$ | do. | —$C_2H_5$ | do. |
| 7 | H | Br | do. | —$CH_2$ $\overset{CH-}{CH_3}$ | do. | do. |
| 8 | H | Cl | —$C_3H_7$ | do. | —$C_3H_7$ | do. |
| 9 | H | Cl | —$CH_3$ | do. | —$CH_3$ | do. |
| 10 | H | Cl | —$CH_2Br$ | —$C_2H_4$— | do. | do. |
| 11 | H | Cl | —$CH_2CH_2Cl$ | —$C_2H_4$— | do. | do. |
| 12 | H | Cl | —$CH_2CN$ | do. | do. | do. |
| 13 | H | Cl | —$CH_2OCH_3$ | do. | do. | do. |
| 14 | H | Cl | —$CH_3$ | do. | —$CH_2Cl$ | do. |
| 15 | Br | Br | —$C_4H_9$ | do. | —$C_4H_9$ | do. |
| 16 | H | Br | —$CH_3$ | do. | —$CH_2Br$ | do. |

Formulae of representative dyestuffs of the foregoing Examples are as follows:

EXAMPLE 1

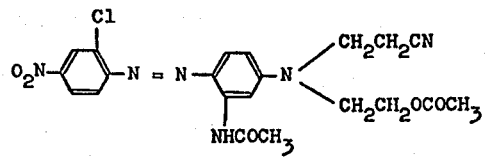

EXAMPLE 2

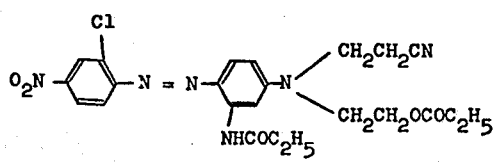

EXAMPLE 9

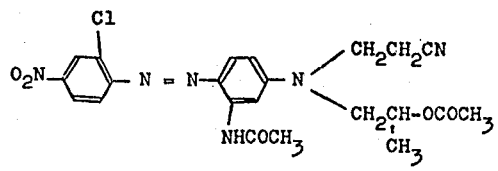

EXAMPLE 11

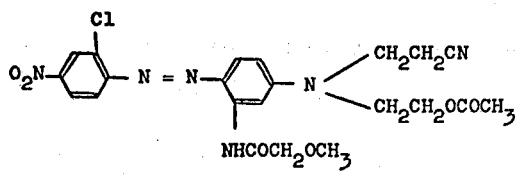

and

EXAMPLE 13

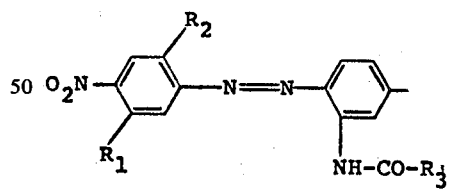

Having thus disclosed the invention what I claim is:
1. A compound of the formula

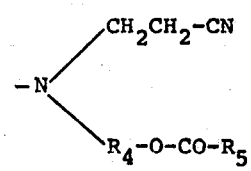

wherein
$R_1$ is hydrogen, chloro or bromo,
$R_2$ is chloro or bromo,
$R_3$ is lower alkyl or monosubstituted lower alkyl wherein the substituent is chloro, bromo, cyano or lower alkoxy,
$R_4$ is —$CH_2CH_2$— or

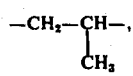

and
$R_5$ is lower alkyl or lower chloroalkyl.

2. A compound according to claim 1 wherein
$R_3$ is lower alkyl or monosubstituted lower alkyl wherein the substituent is chloro, bromo, cyano or methoxy, and
$R_5$ is lower alkyl or chloromethyl.

3. A compound according to claim 2 wherein $R_1$ is hydrogen.

4. A compound according to claim 3 wherein
$R_3$ is alkyl having 1 or 2 carbon atoms or alkyl having 1 or 2 carbon atoms monosubstituted by chloro or methoxy, and
$R_5$ is alkyl 1 or 2 carbon atoms.

5. The compound according to claim 4 having the formula

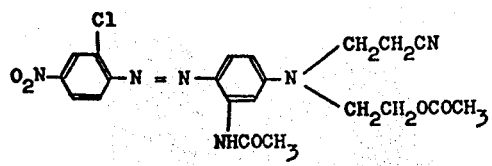

6. The compound according to claim 4 having the formula

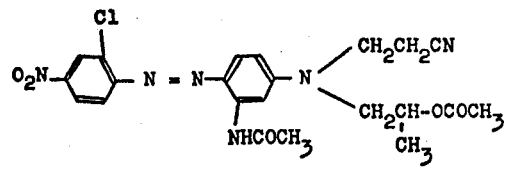

7. The compound according to claim 4 having the formula

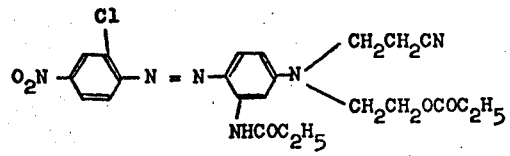

8. The compound according to claim 4 having the formula

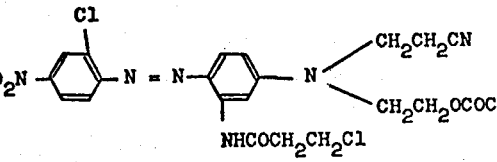

9. The compound according to claim 4 having the formula

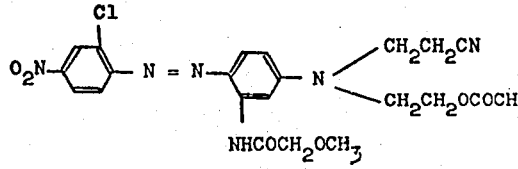

* * * * *